W. H. REPP.
PROJECTION LENS.
APPLICATION FILED SEPT. 21, 1920.
1,415,002.
Patented May 2, 1922.
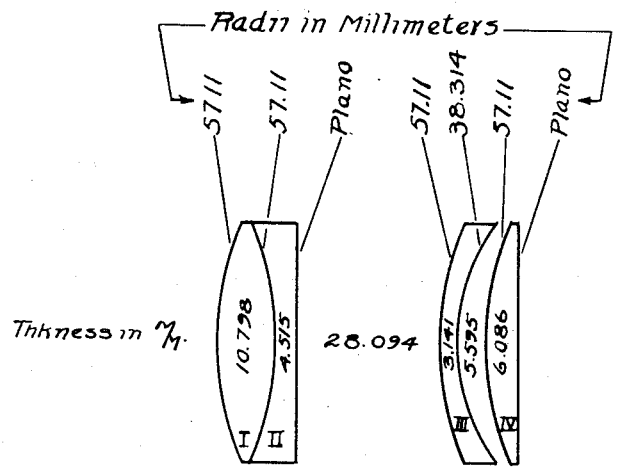

UNITED STATES PATENT OFFICE.

WILLIAM H. REPP, OF ROCHESTER, NEW YORK, ASSIGNOR TO PROJECTION OPTICS COMPANY, INC., OF ROCHESTER, NEW YORK, A CORPORATION OF NEW YORK.

PROJECTION LENS.

1,415,002.  Specification of Letters Patent.  Patented May 2, 1922.

Application filed September 21, 1920. Serial No. 411,772.

*To all whom it may concern:*

Be it known that I, WILLIAM H. REPP, a citizen of the United States, residing in the city of Rochester, county of Monroe, and State of New York, have invented a new and useful Improvement in Projection Lenses, of which the following is a specification.

My invention relates to an improvement in the design of the well known type of Petzval portrait objective lens, whereby without sacrificing any of the high qualities of the original construction, a material reduction in the equipment for the manufacture of this type as a projection objective is attained.

The Petzval lens is the lens to-day mostly used for projection purposes and it was only a logical step to adopt this objective for projection purposes in the early days of the moving picture development, after it had been used extensively for about sixty years in the photographer's studio. It speaks for the excellency of the design, that the modern opticians have not been able to improve optically, and that even high grade anastigmats surpass the Petzval lens only by a better definition on the edge of the field. This however comes into question only for very short focal lengths.

The manufacture of projection lenses differs however from the making of photographic lenses. In the first place the photographer determines the focal length he needs by the size of the plate he wishes to cover and has in his power by changing the distance from lens to object, to produce the image in various sizes. The maker of portrait lenses has therefore only a limited number of formulæ to manufacture, the total of six sizes are usually listed in catalogues of this kind of lens. He derives one step from the other by multiplying all the radii, thickness, spacings, etc., by a certain factor. The maker of projection lenses however faces a different problem, for after the theatre is built, the projection machine set and a screen of certain size placed, the operator orders a lens that will project a picture that will exactly cover the screen, the result is that the lens required must be of a definite size and that the trade specifies projection lenses from 2″ to 9″ focus in ⅛ steps. Some manufactures solve the problem by deriving the next few steps from a certain formula by changing one or more radii, but this generally sacrifices some optical correction, either color or central definition, or flatness of field, because such a change means that the well balanced equilibrium of the original formula will be disturbed. I refer to Von Rohr's book, Theorie und Geschichte des Photographischen Objektives, where on page 250 the original Petzval constructional data are given, showing seven different radii used in the formula of 100 m/m focal length: 52.9 — 41.40 — 436.2 — 104.8—36.8— 45.5—and 149.5 m/m. Practically the same amount of curves are required to grind the modifications of Voigtlaender and Zincke-Sommer.

The object of my invention was to derive an objective with as many plano surfaces, no curvature, as possible, and to reduce the amount of curves, to be used in grinding, to a minimum, namely two. In other words, when a new focal length has to be derived, only two new curves have to be made to produce the new step and the corrections are maintained throughout the whole series of focal lengths. It is obvious that the plano surfaces will be common to all designs and the necessary equipment for all focal lengths will be very much reduced. But it is not only the initial cost of making the equipment but also the handling of lenses in the making very much simplified and therefore the manufacturing cost decreased.

Referring to the accompanying drawing, I produce herewith a numerical example of the present invention, which will enable any one skilled in the art of optical design, to derive mathematically how well the lens is corrected for color, central definition and flatness of field. This example does not restrict my invention to the use of these particular glasses, radii or spacings, in fact I am using different separations where flatness of field is preferred and different separations where emphasis is laid on a short over all length of the construction. Furthermore, I wish to maintain the right to apply this principle to other systems in applied optics as photography, compound telescopes objectives, etc.

The accompanying drawing represents a full size diagram of a lens constructed according to my invention of 100 mm. equivalent focus. The screen receiving the projected image is supposed to be to the left of the system, the film to be projected being placed at the right hand focal plane. Numbering the lenses from left to right as I, II, III, IV, further designating the first radius $\gamma_1$, second radius $\gamma_2$, etc.; the lens thickness as $d_1$, $d_2$, etc.; the first air space as $\Delta_1$, second $\Delta_2$, and the index of refraction for the sodium yellow or D line and V the dispersive reciprocal (definition, see any book on optical glass or catalogue,) the formula can be expressed in form of a table as it is customary:

$\gamma_1 = 57.111$
$d_1 = 10.798$
$\gamma_2 = 57.111$   $\Delta_1 = 28.094$
$d_2 = 4.515$
$\gamma_3 = \infty$ $\gamma_4 = 57.111$
$d_3 = 3.141$   $\Delta_2 = 5.595$
$\gamma_5 = 38.314$ $\gamma_6 = 57.111$
$d_7 = 6.086$
$d_7 = \infty$

| Lens | nd | v |
|---|---|---|
| I and IV | 1.51600 | 63.8 |
| II and III | 1.61820 | 36.4 |

The dimensions are given in millimeters for a lens of 100 mm. equivalent focal length and, as it is known, any other focal length can be derived by multiplying all the radii, and thicknesses and spacings by a common factor, which is equal to the new focal length expressed in mm. divided by 100. The description shows that in addition to the plano surface only two radii have been used, but that four different shapes and four different focal lengths are required to achieve the desired results. Lens I is an equiconvex lens made from crown glass, which has to be cemented to a plano-concave lens II, made from flint glass to produce a cemented doublet, corrected for itself for spherical aberration and colors. This cemented doublet, commonly called the front combination, has a focal length approximately 1.36 times longer than the complete system. The rear combination is considerably longer (about 2.42 times of the complete system) and is achromatized for itself and produces the required correction of the whole system (spherical aberration, coma, flatness of field) by the shape of its lenses and the separations. It consists of a very pronounced negative meniscus, lens III, made from flint glass, and a simple plano-convex lens IV made from crown glass. The choice of the glasses and shapes of lenses enabled me to reduce the first air space $\Delta_1$, from 46.6 as used in Petzval's original design to 28.2.

The diagram shows an objective ground to my invention uses the same curves four times namely, twice on the objective crown of the cemented combination, once on the outside of the air space flint and once on the air space crown. The second curve which is stronger is used only once on the air flint. The rest of the surfaces have no curvature. The example is worked out for a lens of 100 m/m. equivalent focal length and a relative aperture ratio F/2.2.

Therefore I claim;

1. A projection lens, having four lenses therein, arranged from front to back as follows; a double convex lens, cemented to a concave plano lens, the two forming the front combination, a convex concavo lens, a short facing and a convex plano lens, the latter two forming the rear combination, the convex surfaces of the lenses all having the same curvature.

2. A projection lens, having four lenses therein, arranged from front to back as follows; a double convex lens, cemented to a concave plano lens, the two forming the front combination, a convex concavo lens. a short facing and a convex plano lens, the latter two forming the rear combination, the convex surfaces of the lenses all having the same curvature; the concave surface of one of the lenses having a curvature of a smaller radius than the radii of the convex surfaces of the other lenses.

WILLIAM H. REPP.

Witnesses:
ALFRED J. MILLER,
GEO. B. WESLEY.